(12) United States Patent
Moran et al.

(10) Patent No.: US 11,117,544 B2
(45) Date of Patent: Sep. 14, 2021

(54) CURTAIN AIRBAG WITH ANTI-WRAPPING TETHER

(71) Applicant: ZF Passive Safety Systems US Inc., Washington, MI (US)

(72) Inventors: Dylan P. Moran, Rochester Hills, MI (US); Richard C. Patton, Ortonville, MI (US); Avadhoot R. Paranjpe, Shelby Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 253 days.

(21) Appl. No.: 16/458,576

(22) Filed: Jul. 1, 2019

(65) Prior Publication Data
US 2021/0001798 A1    Jan. 7, 2021

(51) Int. Cl.
*B60R 21/232*    (2011.01)
*B60R 21/2338*    (2011.01)
*B60R 21/213*    (2011.01)

(52) U.S. Cl.
CPC .......... *B60R 21/232* (2013.01); *B60R 21/213* (2013.01); *B60R 21/2338* (2013.01); *B60R 2021/23386* (2013.01)

(58) Field of Classification Search
CPC . B60R 21/232; B60R 21/213; B60R 21/2338; B60R 2021/23386; B60R 21/2346
See application file for complete search history.

(56) References Cited

U.S. PATENT DOCUMENTS

| 8,770,619 B2 * | 7/2014 | Nakamura ............ B60R 21/213 |
| | | 280/730.2 |
| 10,960,842 B2 * | 3/2021 | Shimizu ................ B60R 21/213 |
| 2021/0114545 A1 * | 4/2021 | Moran ................... B60R 21/201 |

* cited by examiner

*Primary Examiner* — Paul N Dickson
*Assistant Examiner* — Joselynn Y Sliteris
(74) *Attorney, Agent, or Firm* — Tarolli, Sundheim, Covell & Tummino LLP (57) ABSTRACT

An apparatus for helping to protect an occupant of a vehicle includes a curtain airbag inflatable from a stored condition in which the airbag is rolled and/or folded to a deployed condition in which the curtain airbag is positioned between a side structure of the vehicle and the vehicle occupant. The curtain airbag comprises an inflator mouth configured to receive an inflator. The curtain airbag comprises a bracket tab proximate to the inflator mouth and configured to receive an inflator bracket. A tether has first and second end portions. The first end portion of the tether is connected to a portion of the curtain airbag adjacent to the bracket tab. The second end portion of the tether is connected to the bracket tab.

18 Claims, 9 Drawing Sheets

CURTAIN AIRBAG WITH ANTI-WRAPPING TETHER

FIELD OF THE INVENTION

The invention relates to an apparatus for helping to protect an occupant of a vehicle. More particularly, the invention relates to an airbag inflatable between a side structure of a vehicle and a vehicle occupant.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that is fixed to the roof of the vehicle and/or to a support structure adjacent to the roof of the vehicle. The inflatable curtain is configured to inflate from the roof of the vehicle downward inside the passenger compartment in the event of a side impact or a vehicle rollover. The inflatable curtain, when inflated, is positioned between a vehicle occupant and the side structure of the vehicle.

Certain inflatable curtains include a plurality of mounting assemblies along a length of the inflatable curtain for mounting the inflatable curtain to the roof of the vehicle and/or to a support structure adjacent to the roof of the vehicle. In certain inflatable curtain configurations, an inflator mouth is positioned between two of the mounting assemblies and separates those two mounting assemblies by a predetermined distance. If left unsupported, a portion of the curtain airbag between the two separated mounting assemblies can sag downwardly with respect to other portions of the curtain airbag when the inflatable curtain is stored and mounted to the vehicle.

Certain inflatable curtains can be a component of an airbag module having various other components, such as an inflator. During the assembly of the inflatable curtain airbag with the other components of the airbag module, the inflatable curtain is rolled and/or folded. During the rolling/folding process, portions of the inflatable curtain can become undesirably wrapped around the circumference of the rolled and/or folded inflatable curtain. These wrapped portions of the inflatable curtain can hinder and/or prevent the deployment of the inflatable curtain.

SUMMARY OF THE INVENTION

According to one aspect, an apparatus for helping to protect an occupant of a vehicle includes a curtain airbag inflatable from a stored condition in which the airbag is rolled and/or folded to a deployed condition in which the curtain airbag is positioned between a side structure of the vehicle and the vehicle occupant. The curtain airbag comprises an inflator mouth configured to receive an inflator. The curtain airbag comprises a bracket tab proximate to the inflator mouth and configured to receive an inflator bracket. A tether has first and second end portions. The first end portion of the tether is connected to a portion of the curtain airbag adjacent to the bracket tab. The second end portion of the tether is connected to the bracket tab.

According to another aspect, alone or in combination with any other aspect, the first end portion of the tether can be connected to the inflator mouth.

According to another aspect, alone or in combination with any other aspect, a length of the tether can be less than a circumference of the rolled and/or folded curtain airbag. As a result of the length of the tether being less than the circumference of the rolled and/or folded curtain airbag, a portion of the bracket tab can be prevented from wrapping a predetermined degree about the circumference of the rolled and/or folded curtain airbag.

According to another aspect, alone or in combination with any other aspect, the tether can comprise a first segment extending in a vehicle fore-aft direction and a second segment extending in a vehicle up-down direction so that the tether has a L-shaped configuration. The first segment can comprise the first end portion of the tether. The second segment can comprise the second end portion of the tether. The length of the tether can comprise the combined length of the first and second segments of the tether.

According to another aspect, alone or in combination with any other aspect, the tether can be configured to increasingly tension as a portion of the bracket tab wraps around the rolled and/or folded curtain airbag in a first direction until the tether reaches a predetermined tension limit. The tether can substantially prevent the bracket tab from further wrapping around the rolled and/or folded curtain airbag in the first direction once the tether is tensioned to the predetermined tension limit.

According to another aspect, alone or in combination with any other aspect, the curtain airbag can further comprise a plurality of mounting tabs for mounting the curtain airbag to a support structure of the vehicle. The curtain airbag can further comprise an inflator attachment region extending between two of the mounting tabs. The inflator attachment region can comprise the inflator mouth. The inflator attachment region can be mounted to the support structure at a fore end portion of the inflator attachment region through a fore-positioned mounting tab. The inflator attachment region can be mounted to the support structure at an aft end portion of the inflator attachment region through an aft-positioned mounting tab.

According to another aspect, alone or in combination with any other aspect, the bracket tab can be positioned between the fore and the aft end portions of the inflator attachment region. The inflator bracket can be inserted through a loophole of the bracket tab and attached to the support structure of the vehicle. The connection between the bracket tab and the roof rail can mount a portion of the inflator attachment region adjacent to the bracket tab to the support structure to limit and/or prevent the portion of the inflator attachment region adjacent to the bracket tab from sagging downwardly when the curtain airbag is in the stored condition.

According to another aspect, alone or in combination with any other aspect, the apparatus can further include a clamp positioned about the inflator bracket and a portion of the inflator mouth having the inflator positioned therein. The inflator bracket can mount a portion of the inflator mouth adjacent to the clamp to the support structure of the vehicle through the clamp. The connection between the portion of the inflator mouth adjacent to the clamp and the support structure can mount a portion of the inflator attachment region adjacent to the clamp to the support structure to limit and/or prevent the portion of the inflator attachment region adjacent to the clamp from sagging downwardly when the curtain airbag is in the stored condition.

According to another aspect, alone or in combination with any other aspect, the bracket tab can be positioned between the inflator mouth and the aft-positioned mounting tab. The connection between the bracket tab and the roof rail can limit and/or prevent a portion of the inflator attachment region between the clamp and the aft-positioned mounting tab from downwardly sagging when the curtain airbag is in the stored condition.

According to another aspect, alone or in combination with any other aspect, the curtain airbag can be a one-piece woven (OPW) curtain airbag. The tether can comprise an integral woven portion of the OPW curtain airbag with the first end portion of the tether being formed integrally with the inflator mouth.

According to another aspect, alone or in combination with any other aspect, the curtain airbag can comprise a split in airbag material at the inflator mouth that extends in a vehicle fore direction from an open side portion of the inflator mouth. The split can define the first end portion of the tether and separating the first end portion of the tether from an adjacent portion of the inflator mouth.

According to another aspect, alone or in combination with any other aspect, can further include a clamp configured for retaining the inflator in the inflator mouth. The clamp can be positioned about a portion of the inflator mouth having the inflator positioned therein. A portion of the clamp can be positioned in a vehicle up-down direction between the first end portion of the tether and a portion of the inflator mouth.

According to another aspect, alone or in combination with any other aspect, the curtain airbag can be a one-piece woven (OPW) curtain airbag. The OPW curtain airbag can comprise two fabric layers that are interwoven in portions to form OPW seams. The inflator bracket tab can comprise integral woven portions of the OPW curtain airbag. Two end portions of the bracket can be interconnected by the OPW seams to define a loophole of the bracket tab. The loophole can be configured to receive the inflator bracket.

According to another aspect, alone or in combination with any other aspect, the loophole can have two open end portions for receiving the inflator bracket.

According to another aspect, alone or in combination with any other aspect, the tether can comprise an integral woven portion of the OPW curtain airbag with the first end portion of the tether being formed integrally with the inflator mouth and the second end portion of the tether being formed integrally with the bracket tab.

According to another aspect, alone or in combination with any other aspect, the curtain airbag can comprise a split in airbag material at the inflator mouth that extends in a vehicle fore direction from an open side portion of the inflator mouth. The split can define the first end portion of the tether and separate the first end portion of the tether from an adjacent portion of the inflator mouth.

According to another aspect, an airbag module can comprise the apparatus.

According to another aspect, a vehicle safety system can comprise the airbag module.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

An apparatus 10 for helping to protect an occupant 12 of a vehicle 14 includes an inflatable vehicle occupant protection device 16 in the form of an airbag, such as a curtain airbag, for helping to protect the vehicle occupant. In the embodiment illustrated in FIG. 1, the curtain airbag 16 is shown on a driver side 18 of the vehicle 14 for helping to protect driver side vehicle occupants. Those skilled in the art will appreciate that the apparatus 10 disclosed herein could be adapted for use on a passenger side (not shown) of the vehicle 14 for helping to protect passenger side vehicle occupants.

Figure 1:
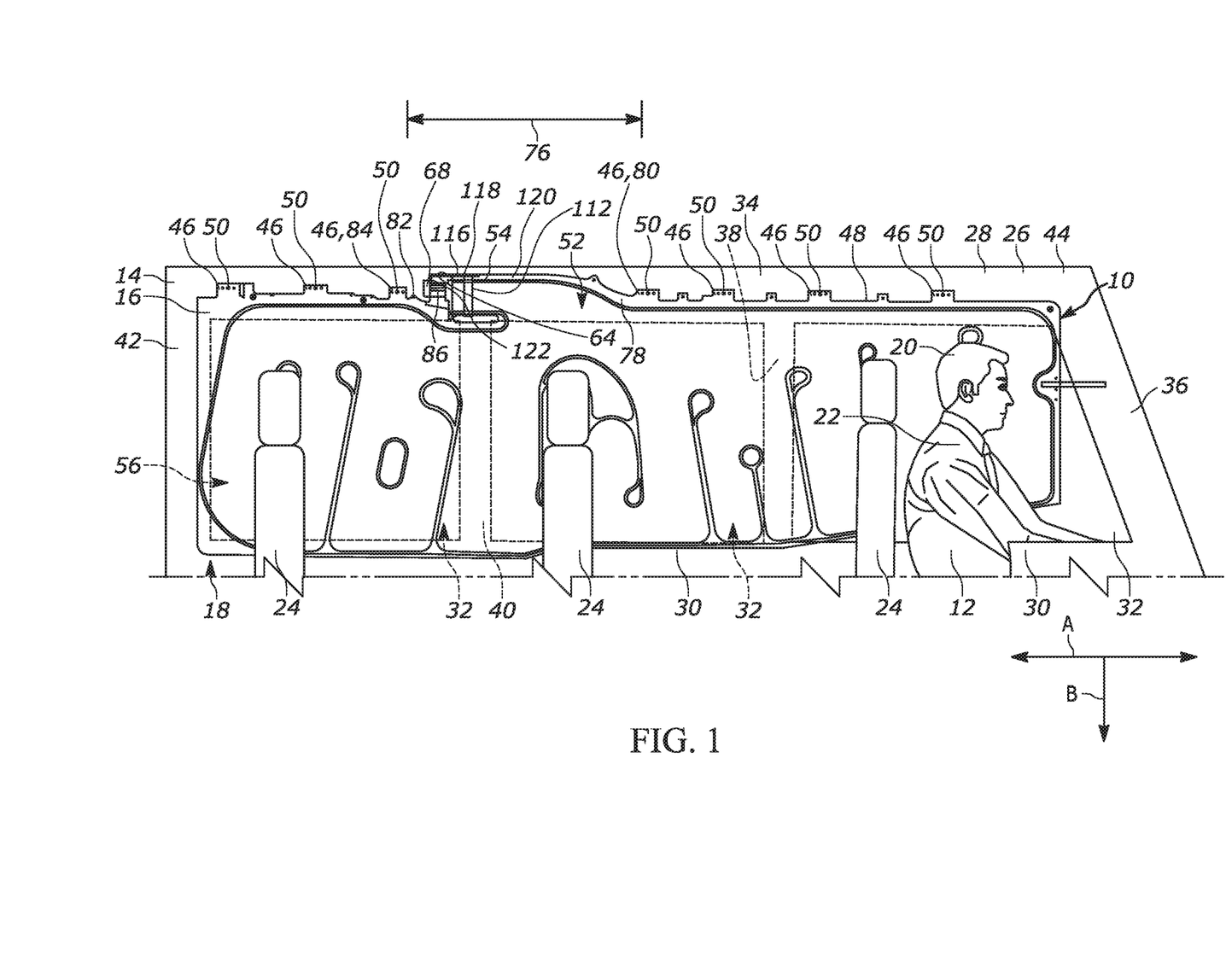
FIG. 1 is a schematic inboard side view illustrating an apparatus for helping to protect an occupant of a vehicle in a deployed condition.

Portions of the occupant 12, such as the occupant's head 20 and torso 22, are depicted schematically in FIG. 1. The vehicle 14 includes at least one vehicle seat 24 for the vehicle occupants 12, a vehicle roof 26, and a side structure 28. The vehicle 14 has three rows of seating which help dictate the configuration of the side structure 28. In the example configuration shown in FIG. 1, the side structure 28 of the vehicle 14 includes two vehicle doors 30, three side windows 32, a roof rail 34, an A-pillar 36, a B-pillar 38, a C-pillar 40, and a D-pillar 42. The apparatus 10 can, however, be applied to vehicles having any number of rows, and thus any side structure configuration.

The curtain airbag 16 can be constructed of any suitable material, such as nylon (e.g., woven nylon 6-6 yarns), and can be constructed in any suitable manner. For example, the curtain airbag 16 may have a one-piece woven (OPW) construction in which the curtain airbag is woven as a single piece of material. As another example, the curtain airbag 16 can include more than one piece of material. If more than one piece is used, the pieces can be interconnected by known means, such as stitching, ultrasonic welding, heat bonding, or adhesives, to form the curtain airbag 16. The curtain airbag 16 can be uncoated, coated with a material, such as a gas impermeable urethane, or laminated with a material, such as a gas impermeable film. The curtain airbag 16 thus can have a gas-tight or substantially gas-tight construction. Those skilled in the art will appreciate that alternative materials, such as polyester yarn, and alternatives coatings, such as silicone, can also be used to construct the curtain airbag 16.

Figure 2:
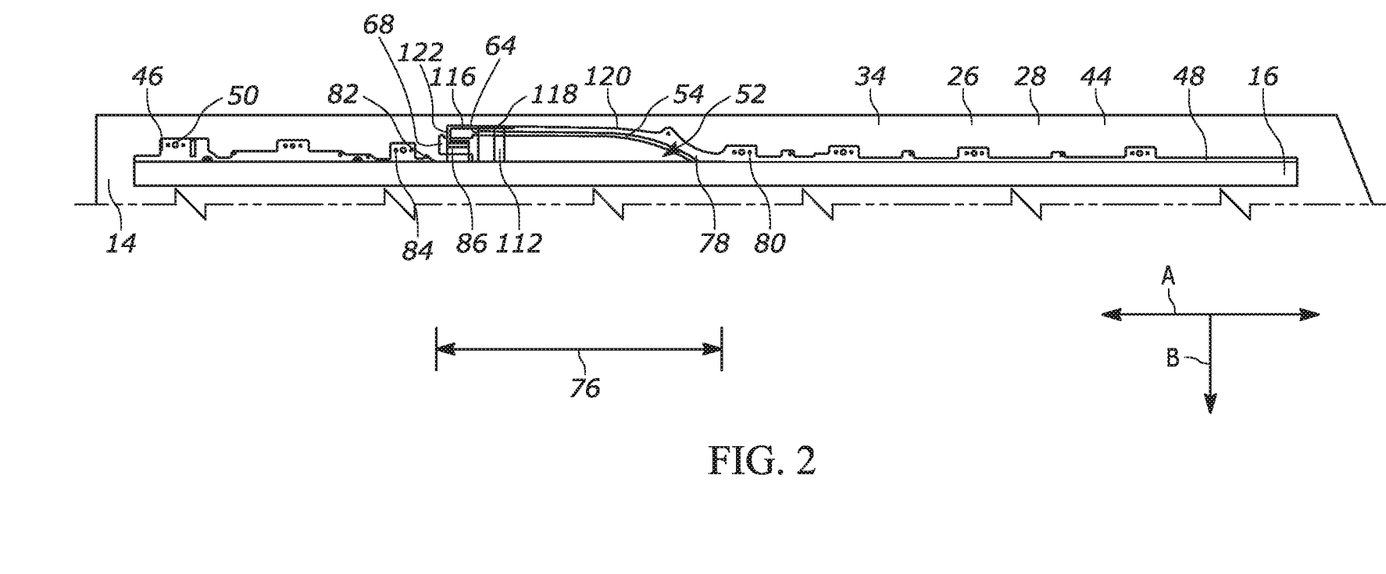
FIG. 2 is a schematic inboard side view of a portion of the apparatus of FIG. 1, in a stored condition.

As shown in the example configuration of FIGS. 1-2, the curtain airbag 16 is mounted to a support structure 44 of the vehicle 14. When the curtain airbag 16 is in a stored condition, the curtain airbag is rolled and/or folded and contained in the support structure 44. The curtain airbag 16 is inflatable and deployable from the stored condition (FIG. 2) away from the support structure 44 and toward a deployed condition (FIG. 1) in which the curtain airbag is positioned between the side structure 28 and the vehicle occupant 12. The support structure 44 can be any structure in the vehicle 14 that will accommodate the curtain airbag 16 being deployed therefrom so that the deployed curtain airbag is positioned between the side structure 28 and the vehicle occupant 12. In the example configuration shown in FIGS. 1-2, the support structure 44 is the roof rail 34. The curtain airbag 16 can be mounted to the roof rail 34 in any manner known in the art. In the example configuration depicted in FIGS. 1-2, the curtain airbag 16 includes a plurality of mounting tabs 46 spaced in a vehicle fore-aft direction, as indicated by an arrow "A" in FIGS. 1-2, along a length of an upper end portion 48 of the curtain airbag. A fastener 50 is provided at each of the mounting tabs 46 to mount the curtain airbag 16 of the apparatus 10 to the roof rail 34.

Figure 3:
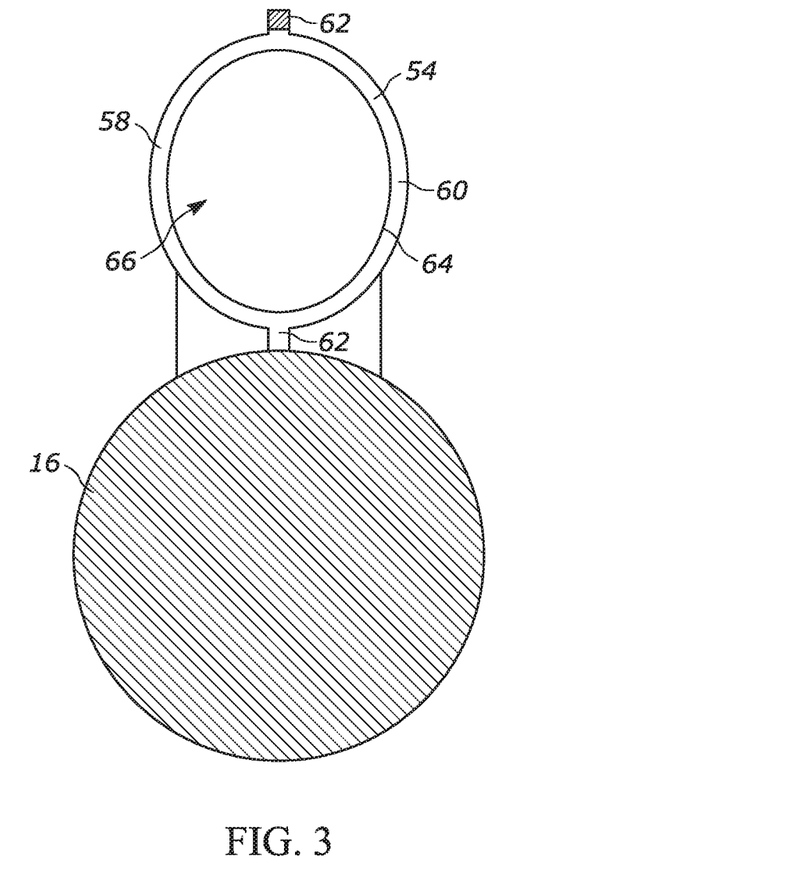
FIG. 3 is a sectional view of a portion of the apparatus of FIG. 2.

The upper end portion 48 of the curtain airbag 16 further includes an inflator attachment region 52 extending between two of the mounting tabs 46. The inflator attachment region 52 comprises an inflator mouth 54 in fluid communication with an inflatable volume 56 of the curtain airbag 16. The inflator mouth 54 can be formed in any manner known in the art. In the example configuration of FIGS. 1-3, the curtain airbag 16 has a one-piece woven (OPW) construction and the inflator mouth 54 is integrally formed with, i.e., at the same time as, the OPW curtain airbag. The inflator mouth 54 thus comprises integral woven portions of the OPW curtain airbag 16. As shown in FIG. 3, the OPW curtain airbag 16 has two fabric layers 58, 60 that comprise integral woven portions of the OPW curtain airbag. The two fabric layers 58, 60 are woven simultaneously and interwoven in portions to form OPW seams 62 that define the inflator mouth 54. The fabric layers 58, 60 are interconnected by the OPW seams 62 along at least two side portions of the inflator mouth 54 to define an inflator mouth opening 64 and a fluid passageway 66. Both of the inflator mouth opening 64 and the fluid passageway 66 are in fluid communication with the inflatable volume 56 of the curtain airbag 16.

An inflator 68 is mounted to the roof rail 34 of the vehicle 14 by an inflator bracket 70. The inflator 68 is connected to and/or received in the inflator mouth 54. In the example configuration of FIGS. 1-2, a portion of the inflator 68 is inserted into the fluid passageway 66 through the inflator mouth opening 64. The inflator 68 is actuatable to provide inflation fluid to the inflatable volume 56 of the curtain airbag 16 to inflate and deploy the curtain airbag from the stored condition to the deployed condition. The inflator 68 can be of any known type, such as stored gas, solid propellant, augmented, or hybrid. An airbag controller (not shown) can be operatively connected to the inflator 68 via lead wires (not shown). The airbag controller is configured to actuate the inflator 68 in response to sensing the occurrence of an event for which occupant protection is desired, such as a collision.

As shown in FIGS. 1-2, the inflator attachment region 52 spans a predetermined length 76 in the vehicle fore-aft direction A along the upper end portion 48 of the curtain airbag 16. The inflator attachment region 52 is supported at a fore end portion 78 of the inflator attachment region by being mounted to the roof rail 34 through a fore-positioned mounting tab 80. The inflator attachment region 52 is supported at an aft end portion 82 of the inflator attachment region by being mounted to the roof rail 34 through an aft-positioned mounting tab 84. The inflator attachment region 52, however, is not supported by a mounting tab 46 between the fore and the aft end portions 78, 82 of the inflator attachment region. This lack of support between the fore and the aft end portions 78, 82 of the inflator attachment region 52 could result in a portion of the inflator attachment region sagging in a downward direction, as indicated by an arrow "B" in FIGS. 1-2, with respect to other portions of the curtain airbag 16 when the curtain airbag is in the stored condition.

Figure 4:
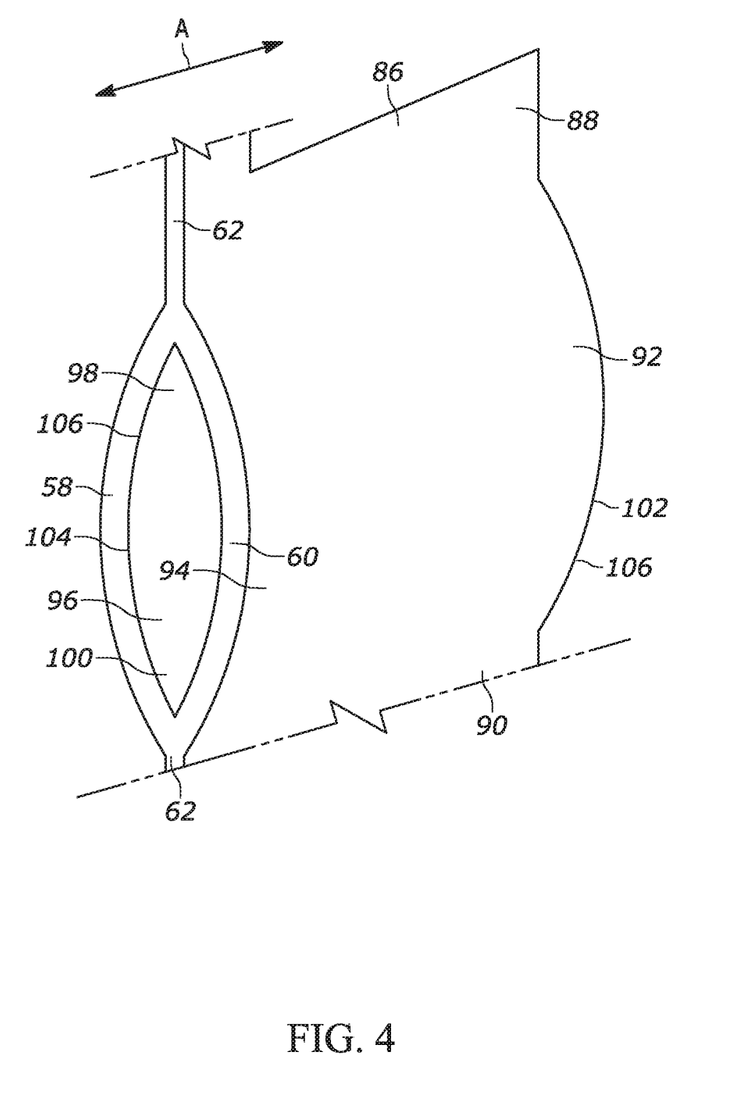
FIG. 4 is a perspective rear and outboard side view of an element of the apparatus of FIG. 1.

To help prevent the curtain airbag 16 from sagging along the length 76 of the inflator attachment region 52, the upper end portion 48 of the curtain airbag includes a bracket tab 86 that supports a portion of the inflator attachment region. The bracket tab 86 can be provided at any position along the length 76 of the inflator attachment region 52 between the fore and the aft end portions 78, 82 of the inflator attachment region. In the example configuration depicted in FIGS. 1-2, the bracket tab 86 is provided proximate to the inflator mouth opening 64. The bracket tab 86 can be formed in any manner known in the art. In the example configuration depicted in FIGS. 1-2 and 4, the bracket tab 86 is integrally formed with, i.e., at the same time as, the OPW curtain airbag 16. The bracket tab 86 thus comprises integral woven portions of the OPW curtain airbag 16. As shown in FIG. 4, the two fabric layers 58, 60 of the OPW curtain airbag 16 are woven simultaneously and interwoven in portions to form OPW seams 62 that define the bracket tab 86. The two fabric layers 58, 60 overlie one another at the bracket tab 86. The overlying fabric layers 58, 60 are interconnected by the OPW seams 62 along at least two end portions 88, 90, 92, 94 of the bracket tab 86 to define a loophole 96 of the bracket tab. Thus, at least two end portions 98, 100, 102, 104 of the loophole 96 can be bounded by the OPW seams 62.

In the example configuration shown in FIG. 4, upper and lower end portions 88, 90 of the bracket tab 86 are interconnected by the OPW seams 62 while fore and aft end portions 92, 94 of the bracket tab are not. In this configuration, only upper and lower end portions 98, 100 of the loophole 96 are bounded by the OPW seams 62 so that the loophole extends in the vehicle fore-aft direction A. The bracket tab 86 has an open end portion 106 at each of the fore and aft end portions 92, 94 of the bracket tab for receiving a portion of the inflator bracket 70. Accordingly, the loophole 96 has the open end portion 106 at each of fore and aft end portions 102, 104 of the loophole for receiving a portion of the inflator bracket 70. Although the bracket tab 86 and the loophole 96 have been described as having two open end portions 106, those skilled in the art will understand that the bracket tab and the loophole can have any number of open end portions to accommodate a connection between the inflator bracket 70 and the bracket tab.

Instead of the loophole 96 being formed integrally with the curtain airbag 16, the two fabric layers 58, 60 at the bracket tab 86 can be separately stitched or otherwise connected to form the loophole. Alternatively, the bracket tab 86 and loophole 96 can be formed from a single layer portion of the curtain airbag 16 that is folded over and stitched or otherwise connected to the curtain airbag to form the bracket tab and the loophole. The bracket tab 86 and the loophole 96 can also be formed from a separate length of material, such as from a single length of material or from a plurality of lengths of material that are connected to one another to collectively form the separate length of material. The separate length of material can be stitched or otherwise connected to the curtain airbag 16 to form the bracket tab 86 and the loophole 96.

Figure 5:
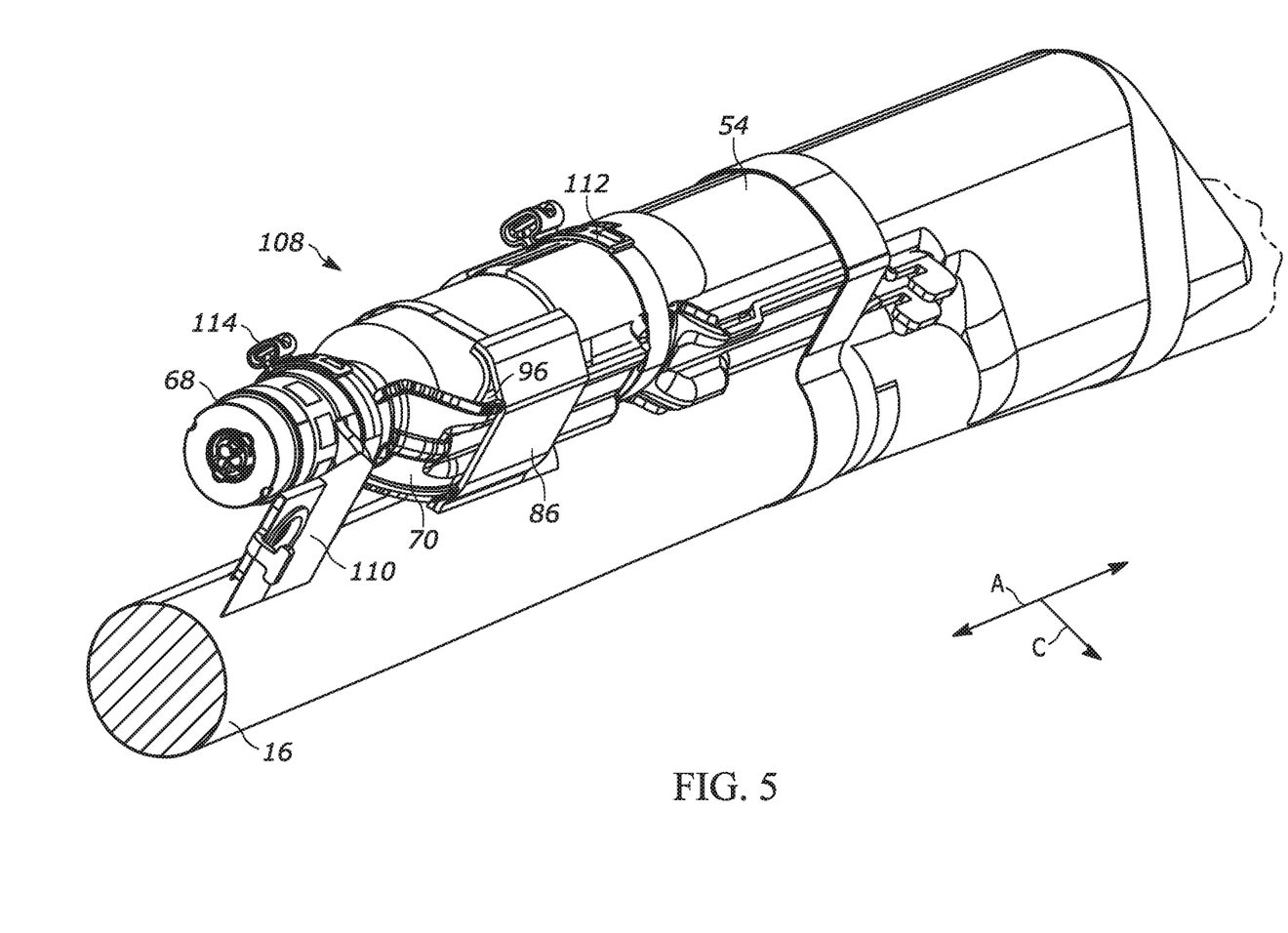
FIG. 5 is a sectional view of a portion of the apparatus of FIG. 2.

FIG. 5 shows the curtain airbag 16, the inflator 68, and the inflator bracket 70 assembled to form an airbag module 108 that can be installed in the vehicle 14 as a unit. The following describes an example process by which the airbag module 108 can be properly assembled. This example process is not intended to limit the manner in which the airbag module 108 is assembled. Those skilled in the art will appreciate that certain steps of the below example process can be performed before and/or after certain other steps of the process whether expressly stated or not.

The curtain airbag 16 is spread to a substantially flattened configuration. The curtain airbag 16 is then rolled and/or folded up to the upper end portion 48 of the curtain airbag. In the example configuration, the curtain airbag 16 is rolled in the outboard direction, as indicated by an arrow "C" in FIG. 5. Those skilled in the art, however, will appreciate that the curtain airbag 16 can be rolled/folded in any desired manner (e.g., inboard, outboard, etc.) in order to comply with or accommodate various vehicle configurations and/or to produce desired inflation/deployment characteristics. The inflator bracket 70 is inserted through the loophole 96 of the bracket tab 86 and positioned adjacent to the inflator mouth 54. The inflator bracket 70 can also be inserted through a secondary bracket tab 110 that is adjacent to the bracket tab 86. A first clamp 112 (e.g., an Oetiker clamp) is loosely positioned about the inflator bracket 70 and the inflator mouth 54. The inflator 68 is inserted into the inflator mouth 54. The first clamp 112 is tightened to clamp the inflator 68, the inflator bracket 70, and the inflator mouth 54 together. A second clamp 114 (e.g., an Oetiker clamp) can be positioned about another portion of the inflator 68 and the inflator bracket 70. The second clamp 114 is tightened to clamp the inflator 68 and the inflator bracket 70 together. The airbag module 108 can then be attached to the vehicle roof rail 34 or any other desired support structure 44.

When the airbag module 108 is mounted to the roof rail 34, the inflator bracket 70 is attached to the vehicle roof rail 34. This attachment causes the bracket tab 86 to be attached to the roof rail 34 through the inflator bracket 70. This connection of the bracket tab 86 to the roof rail 34 functionally acts as a mounting point that connects the inflator attachment region 52 of the curtain airbag 16 to the roof rail. Because the bracket tab 86 is positioned between the fore and the aft end portions 78, 82 of the inflator attachment region 52, the connection between the bracket tab and the roof rail 34 supports a portion of the inflator attachment region between the fore and the aft end portions of the inflator attachment region (see FIGS. 1-2). This connection helps to limit and/or prevent the portion of the inflator attachment region 52 of the curtain airbag 16 from sagging when the curtain airbag is in the stored condition. This connection also helps provide support for the curtain airbag 16 by serving as an extra attachment location for the curtain airbag so that deployment forces of the deploying curtain airbag is spread between the mounting tabs 46 and the bracket tab 86. Further, the connection between the bracket tab 86 and the roof rail 34 also assists in restraining the vehicle occupant 12 during a vehicle collision and/or rollover as the curtain airbag 16 is more strongly fixed to the roof rail due to the additional level of support provided by the connection between the bracket tab and the roof rail.

Further, when the airbag module 108 is mounted to the roof rail 34, a portion of the inflator mouth 54 adjacent to the first clamp 112 is mounted to the roof rail through the inflator bracket 70. The connection of this portion to the roof rail 34 results in a portion of the inflator attachment region 52 adjacent to the first clamp 112 being mounted to the roof rail. The first clamp 112 and the inflator bracket 70 thus support a portion of the inflator attachment region 52 adjacent to the first clamp to help limit and/or prevent this portion of the inflator attachment region from sagging when the curtain airbag is in the stored condition (see FIG. 2). Due to the provision of the first clamp 112, the connection between the bracket tab 86 and the roof rail 34 helps to limit and/or prevent a portion of the inflator attachment region 52 between the first clamp and the aft-positioned mounting tab 84 from sagging when the curtain airbag 16 is in the stored condition (see FIG. 2).

Figure 6:
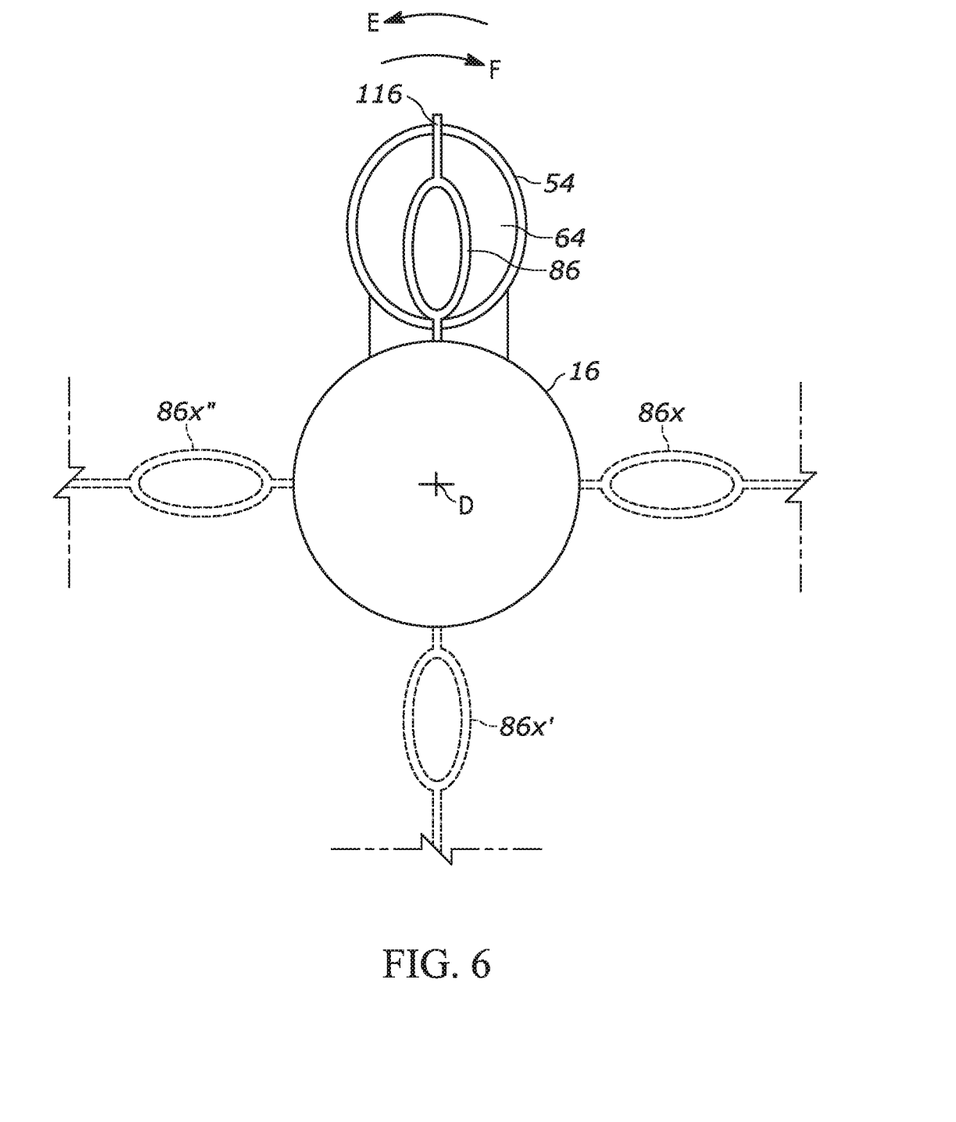
FIG. 6 is a rear view of a portion of the apparatus of FIG. 2, in a first condition.

Referring to FIG. 6, prior to the assembly of the curtain airbag 16 with the other components of the airbag module 108, when the curtain airbag is properly rolled/folded, the bracket tab 86 and the inflator mouth 54 should extend at about a 12 o'clock position relative to the rolled/folded airbag. If, however, the curtain airbag 16 is not rolled/folded properly, the bracket tab 86 and/or the inflator mouth 54 can extend at positions other than the desired 12 o'clock position. This can occur, for example, if the curtain airbag 16 is rolled/folded loosely and/or if the curtain airbag becomes twisted about its roll axis, as indicated at "D" in FIG. 6. For example, the bracket tab 86 can extend from a non-12 o'clock position, such as a 3 o'clock position (indicated at 86x in FIG. 6), a 6 o'clock position (indicated at 86x' in FIG. 6), or a 9 o'clock position (indicated at 86x" in FIG. 6).

To illustrate the problems that could occur, as an example, a twist in the rolled/folded curtain airbag 16 could cause the bracket tab 86 to wrap 270 degrees in the counterclockwise direction, as indicated by an arrow "E" in FIG. 6, around the rolled/folded curtain airbag so that the bracket tab extends from the 3 o'clock position with respect to the rolled/folded curtain airbag. The proper corrective action is to move the bracket tab 86 and/or twist the curtain airbag 16 to move the bracket tab 270 degrees back (e.g., clockwise, as indicated by an arrow "F" in FIG. 6) to the 12 o'clock position. An installer could, however, improperly move the bracket tab 86 the short 90 degrees in the counterclockwise direction E to position the bracket tab at the 12 o'clock position. As a result, the bracket tab 86 has wrapped 360 degrees around the rolled/folded curtain airbag. If the bracket tab 86 is wrapped around the rolled/folded curtain airbag 16 in this manner and then connected to the inflator bracket 70/roof rail 34, the bracket tab could itself act as a strap that blocks or otherwise prevents the downward deployment of the curtain airbag 16. This is because the bracket tab 86 would be wrapped around the underside of the rolled/folded curtain airbag 16 and secured to the roof rail 34.

To prevent the improper positioning of the bracket tab 86 relative to the other components of the curtain airbag 16/airbag module 108 and prevent the bracket tab from wrapping around the rolled/folded curtain airbag 16, the apparatus 10 includes an anti-wrapping tether 116. The tether 116 connects the bracket tab 86 to another portion of the curtain airbag 16, such as along the upper end portion 48 of the curtain airbag. In the example configuration of FIGS. 1, 2, and 7, the tether 116 has a first end portion 118 connected adjacent to the bracket tab 86 at an upper end portion 120 of the inflator mouth 54. A second end portion 122 of the tether 116 is connected to the bracket tab 86. In the example configuration of FIGS. 1, 2, and 7, the tether 116 comprises an integral, single-layer woven portion of the OPW curtain airbag 16. The first end portion 118 of the tether 116 is formed integrally with the upper end portion 120 of the inflator mouth 54. The second end portion 122 of the tether 116 is formed integrally with the upper end portion 88 of the bracket tab 86.

Figure 7:
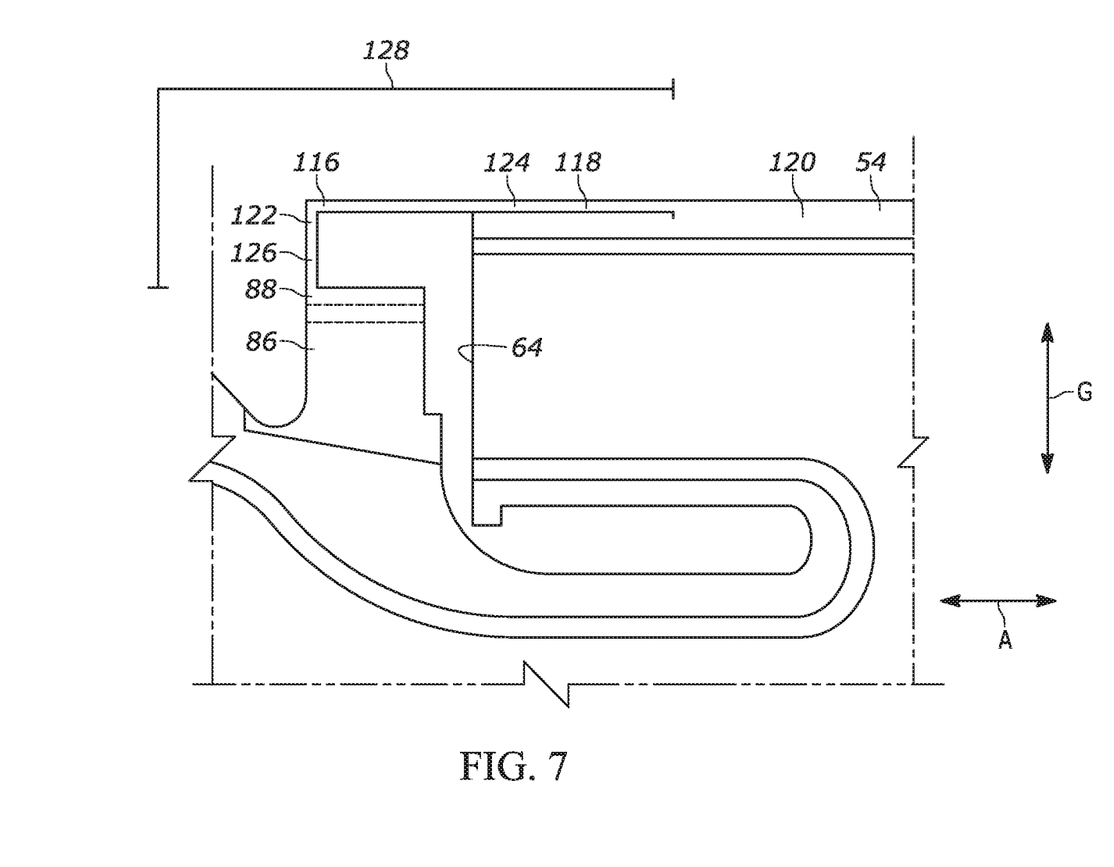
FIG. 7 is a schematic inboard side view of a portion of the apparatus of FIG. 1.

As shown in FIG. 7, the tether 116 can have an L-shaped configuration with a first segment 124 extending in the vehicle fore-aft direction A and a second segment 126 extending in a vehicle up-down direction, as indicated by an arrow "G" in FIG. 7. The first segment 124 of the tether 116 comprises the first end portion 118 of the tether. The second segment 126 of the tether 116 comprises the second end portion 122 of the tether. Although the tether 116 has been shown and described as having an L-shaped configuration, the tether can have any configuration that will support the second end portion 122 of the tether being connected to the bracket tab 86 and the first end portion 118 of the tether being connected to another portion of the curtain airbag 16.

The tether 116 has a length 128 that is designed to help maintain the bracket tab 86 at the desired 12 o'clock position and help prevent the bracket tab 86 from wrapping around the rolled/folded curtain airbag 16 as described previously. The length 128 of the tether 116, i.e., the combined length of the first and the second segments 124, 126 of the tether, is less than the circumference of the rolled/folded curtain airbag 16. As a portion of the bracket tab 86 wraps around the rolled/folded curtain airbag 16 (i.e., moves away from the 12 o'clock position), the tether 116 is increasingly tensioned. This is because the inflator mouth 54 can remain properly positioned at the 12 o'clock position while the bracket tab 86 moves away from the 12 o'clock position and from its alignment with the inflator mouth. The movement of the bracket tab 86 away from the 12 o'clock position causes the second end portion 122 of the tether 116, which is connected to the bracket tab, to be increasingly distanced from the first end portion 118 of the tether, which is connected to the inflator mouth 54. The tension in the tether 116 increases as the distance between the first and the second end portions 118, 122 of the tether increases.

Once the tether 116 reaches a predetermined tension limit, the bracket tab 86 is substantially prevented from moving further away the 12 o'clock position and from further wrapping around the rolled/folded curtain airbag 16. Because the length 120 of the tether 116 is less than the circumference of the rolled/folded curtain airbag 16, the tether reaches the predetermined tension limit before the bracket tab 86 wraps around the circumference of the rolled/folded curtain airbag in either the clockwise or counterclockwise direction F, E. The tether 116 thus limits and/or prevents the bracket tab 86 from wrapping around the circumference of the rolled/folded curtain airbag 16.

The tether 116 also holds the bracket tab 86 in a proper alignment with the inflator mouth 54. The length 128 of the tether 116 determines the degree in which the bracket tab 86 is able to move away from the 12 o'clock position and wrap around the rolled/folded curtain airbag 16. The length 128 of the tether 116 can thus be designed so that the bracket tab 86 is held properly aligned relative to the inflator mouth 54. By holding the bracket tab 86 in proper alignment with the inflator mouth 54, the tether 116 helps to ease the assembly of the airbag module 108. Further, by holding the bracket tab 86 and the inflator 68 in proper alignment with one another, the tether 116 prevents a portion of the curtain airbag 16 adjacent to the bracket tab from twisting about the roll axis D relative to a portion of the curtain airbag adjacent to the inflator mouth. This is because twisting of the portion of the curtain airbag 16 adjacent to the bracket tab 86 relative to the portion of the curtain airbag adjacent to the inflator mouth 54 would cause the bracket tab and the inflator mouth to become misaligned. Therefore, the tether 116 also helps prevent the twisting of the rolled/folded curtain airbag 16 which, as explained above, can contribute to the wrapping of the bracket tab 86.

Figure 8:
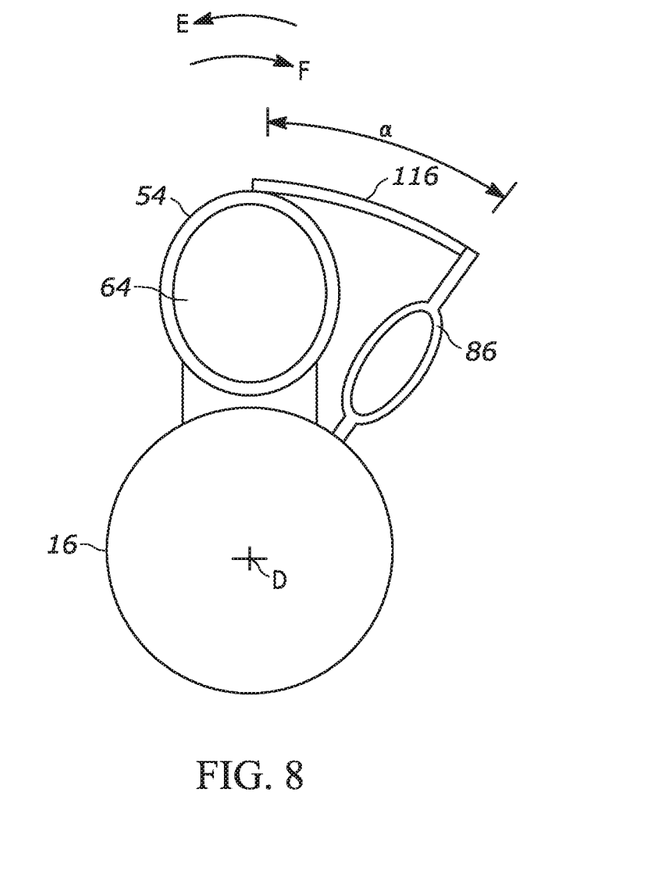
FIG. 8 is a rear view of a portion of the apparatus of FIG. 6, in a second condition.

The tether 116 also provides a visual cue that indicates when the bracket tab 86 has been moved from the 12 o'clock position and wrapped around the rolled/folded curtain airbag 16. When the bracket tab 86 is not wrapped, the tether 116 has the appearance as shown in FIG. 6. The tether 116 has an appearance similar to that shown in FIG. 8 when the bracket tab 86 has been wrapped a particular degree, as indicated at "a" in FIG. 8, in the clockwise direction F around the rolled/folded curtain airbag 16. Thus, when the bracket tab 86 is wrapped around the rolled/folded curtain airbag 16 in either the clockwise or the counterclockwise direction F, E away from the 12 o'clock position, a human observer and/or a programmed vision system can determine that the bracket tab is wrapped based on the appearance of the tether 116.

As shown in the example configuration of FIG. 6, the bracket tab 86 is positioned proximate to the inflator mouth opening 64 when the bracket tab is not wrapped. This positioning of the bracket tab 86 relative to the inflator mouth opening 64 causes the bracket tab to partially block the inflator mouth opening. If the inflator mouth opening 64 remained blocked by the bracket tab 86, inserting the inflator 68 into the inflator mouth 54 could be a difficult task. To prevent the bracket tab 86 from blocking the inflator mouth opening 64 during insertion of the inflator 68, the bracket tab is able to wrap a predetermined degree in either the clockwise or counterclockwise direction F, E to a position in which the bracket tab is no longer blocking the inflator mouth opening. Thus, although the length 128 of the tether 116 helps to prevent the bracket tab 86 from wrapping around the circumference of the rolled/folded curtain airbag 16, the length of the tether is sufficient for the bracket tab to wrap out of the way of the inflator mouth opening 64 (see FIGS. 5 and 8).

Figure 9:
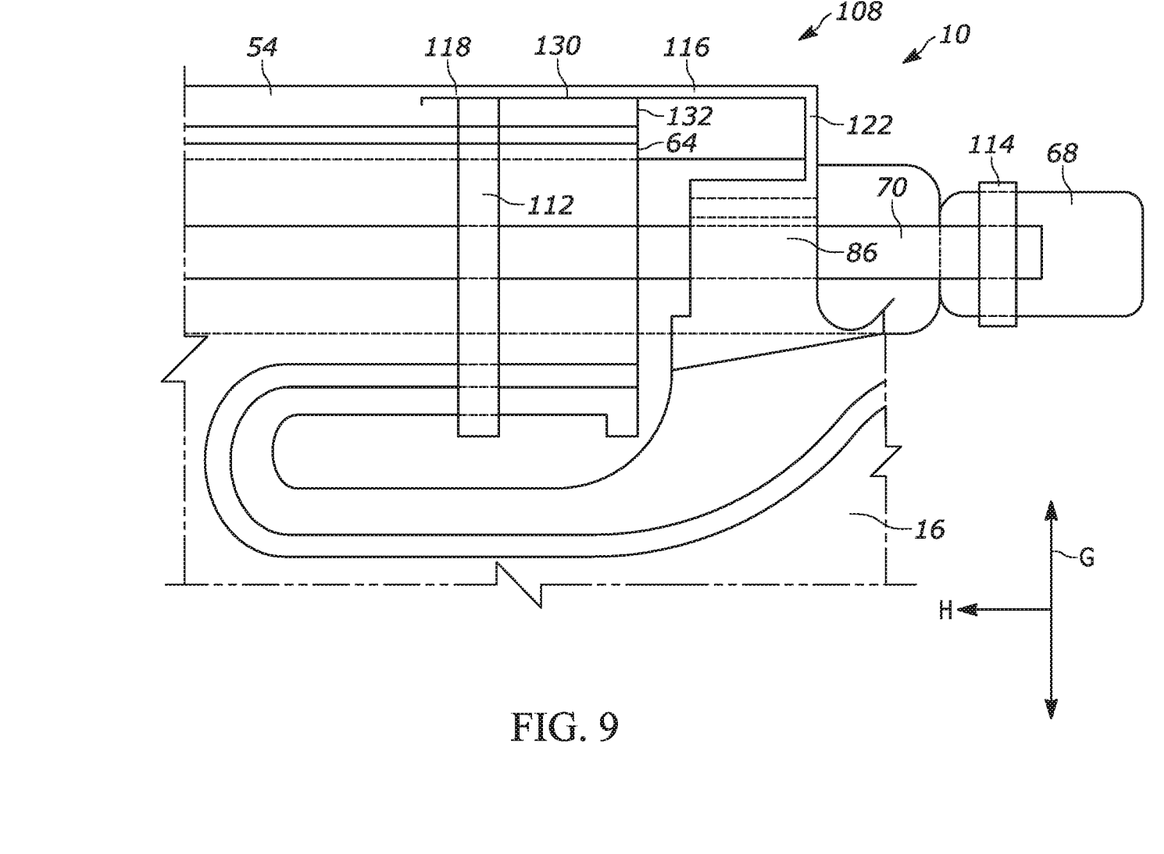
FIG. 9 is a schematic outboard side view of a portion of the apparatus of FIG. 1.

As shown in the example configuration of FIG. 9, the curtain airbag 16 can include a split 130 in the curtain airbag 16 to accommodate the passage of the first clamp 112 over a portion of the inflator mouth 54 without disturbing the tether 116. The split 130 can be a cut in airbag material of the curtain airbag 16 that extends in a vehicle fore direction, as indicated by an arrow "H" in FIG. 9, from an open side portion 132 of the inflator mouth 54. When the first end portion 118 of the tether 116 is formed integrally with the upper end portion 120 of the inflator mouth 54, the formation of the split 130 in the curtain airbag 16 produces and defines the first end portion of the tether. The split 130 also separates the first end portion 118 of the tether 116 from an adjacent portion of the inflator mouth 54. The split 130 allows the first clamp 112 to be inserted in the vehicle fore direction H over the inflator mouth 54 with a portion of the first clamp being positioned in, and passed along, the split. In this configuration, a portion of the first clamp 112 is positioned in the vehicle up-down direction G between the first end portion 118 of the tether 116 and a portion of the inflator mouth 54.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, comprising:
    a curtain airbag inflatable from a stored condition in which the airbag is rolled and/or folded to a deployed condition in which the curtain airbag is positioned between a side structure of the vehicle and the vehicle occupant, the curtain airbag comprising an inflator mouth configured to receive an inflator, the curtain airbag comprising a bracket tab proximate to the inflator mouth and configured to receive an inflator bracket; and a tether having first and second end portions, the first end portion of the tether being connected to a portion of the curtain airbag adjacent to the bracket tab, the second end portion of the tether being connected to the bracket tab.

2. The apparatus recited in claim 1, wherein the first end portion of the tether is connected to the inflator mouth.

3. The apparatus recited in claim 1, wherein a length of the tether is less than a circumference of the rolled and/or folded curtain airbag, and wherein as a result of the length of the tether being less than the circumference of the rolled and/or folded curtain airbag, a portion of the bracket tab is prevented from wrapping a predetermined degree about the circumference of the rolled and/or folded curtain airbag.

4. The apparatus recited in claim 3, wherein the tether comprises a first segment extending in a vehicle fore-aft direction and a second segment extending in a vehicle up-down direction so that the tether has a L-shaped configuration, the first segment comprising the first end portion of the tether, the second segment comprising the second end portion of the tether, and wherein the length of the tether comprises the combined length of the first and second segments of the tether.

5. The apparatus recited in claim 3, wherein the tether is configured to increasingly tension as a portion of the bracket tab wraps around the rolled and/or folded curtain airbag in a first direction until the tether reaches a predetermined tension limit, the tether substantially preventing the bracket tab from further wrapping around the rolled and/or folded curtain airbag in the first direction once the tether is tensioned to the predetermined tension limit.

6. The apparatus recited in claim 1, wherein the curtain airbag further comprises a plurality of mounting tabs for mounting the curtain airbag to a support structure of the vehicle, and wherein the curtain airbag further comprises an inflator attachment region extending between two of the mounting tabs, the inflator attachment region comprising the inflator mouth, the inflator attachment region being mounted to the support structure at a fore end portion of the inflator attachment region through a fore-positioned mounting tab, the inflator attachment region being mounted to the support structure at an aft end portion of the inflator attachment region through an aft-positioned mounting tab.

7. The apparatus recited in claim 6, wherein the bracket tab is positioned between the fore and the aft end portions of the inflator attachment region, and wherein the inflator bracket is inserted through a loophole of the bracket tab and attached to the support structure of the vehicle, the connection between the bracket tab and a roof rail mounts a portion of the inflator attachment region adjacent to the bracket tab to the support structure to limit and/or prevent the portion of the inflator attachment region adjacent to the bracket tab from sagging downwardly when the curtain airbag is in the stored condition.

8. The apparatus recited in claim 7, further comprising a clamp positioned about the inflator bracket and a portion of the inflator mouth having the inflator positioned therein, the inflator bracket mounting a portion of the inflator mouth adjacent to the clamp to the support structure of the vehicle through the clamp, the connection between the portion of the inflator mouth adjacent to the clamp and the support structure mounts a portion of the inflator attachment region adjacent to the clamp to the support structure to limit and/or prevent the portion of the inflator attachment region adjacent to the clamp from sagging downwardly when the curtain airbag is in the stored condition.

9. The apparatus recited in claim 8, wherein the bracket tab is positioned between the inflator mouth and the aft-positioned mounting tab, and wherein the connection between the bracket tab and the roof rail limits and/or prevents a portion of the inflator attachment region between the clamp and the aft-positioned mounting tab from downwardly sagging when the curtain airbag is in the stored condition.

10. The apparatus recited in claim 1, wherein the curtain airbag is a one-piece woven (OPW) curtain airbag, and wherein the tether comprises an integral woven portion of the OPW curtain airbag with the first end portion of the tether being formed integrally with the inflator mouth.

11. The apparatus recited in claim 10, wherein the curtain airbag comprises a split in airbag material at the inflator mouth that extends in a vehicle fore direction from an open side portion of the inflator mouth, the split defining the first end portion of the tether and separating the first end portion of the tether from an adjacent portion of the inflator mouth.

12. The apparatus recited in claim 11, further comprising a clamp configured for retaining the inflator in the inflator mouth, the clamp being positioned about a portion of the inflator mouth having the inflator positioned therein, a portion of the clamp being positioned in a vehicle up-down direction between the first end portion of the tether and a portion of the inflator mouth.

13. The apparatus recited in claim 1, wherein the curtain airbag is a one-piece woven (OPW) curtain airbag, the OPW curtain airbag comprising two fabric layers that are interwoven in portions to form OPW seams,
wherein the bracket tab comprises integral woven portions of the OPW curtain airbag,
and wherein two end portions of the bracket tab are interconnected by the OPW seams to define a loophole of the bracket tab, the loophole being configured to receive the inflator bracket.

14. The apparatus recited in claim 13, wherein the loophole has two open end portions for receiving the inflator bracket.

15. The apparatus recited in claim 13, wherein the tether comprises an integral woven portion of the OPW curtain airbag with the first end portion of the tether being formed integrally with the inflator mouth and the second end portion of the tether being formed integrally with the bracket tab.

16. The apparatus recited in claim 15, wherein the curtain airbag comprises a split in airbag material at the inflator mouth that extends in a vehicle fore direction from an open side portion of the inflator mouth, the split defining the first end portion of the tether and separating the first end portion of the tether from an adjacent portion of the inflator mouth.

17. An airbag module comprising the apparatus of claim 1.

18. A vehicle safety system comprising the airbag module of claim 17.

* * * * *